(12) United States Patent
Kondo et al.

(10) Patent No.: US 6,947,644 B2
(45) Date of Patent: Sep. 20, 2005

(54) OPTICAL FIBER HOLDING STRUCTURE

(75) Inventors: Katsuaki Kondo, Hyogo (JP); Kazuo Imamura, Hyogo (JP); Minoru Yoshida, Hyogo (JP); Yasuhide Sudo, Hyogo (JP); Yoshiyuki Imada, Hyogo (JP); Tatsuhiro Kawamura, Hyogo (JP); Takashi Okuyama, Hyogo (JP); Hideki Okuno, Tokyo (JP); Atsushi Toyohara, Tokyo (JP)

(73) Assignees: Mitsubishi Cable Industries, Ltd., Hyogo (JP); NEC Corporation, Tokyo (JP)

(*) Notice: Subject to any disclaimer, the term of this patent is extended or adjusted under 35 U.S.C. 154(b) by 131 days.

(21) Appl. No.: 10/193,258

(22) Filed: Jul. 12, 2002

(65) Prior Publication Data

US 2003/0012505 A1 Jan. 16, 2003

(30) Foreign Application Priority Data

Jul. 13, 2001 (JP) .................................. P2001-214121

(51) Int. Cl.[7] .............................. G02B 6/26; G02B 6/36; G02B 6/44
(52) U.S. Cl. ............................ 385/43; 385/39; 385/99; 385/135
(58) Field of Search .............................. 385/43–45, 99, 385/114, 135, 39; 359/341.1–341.3, 341.31–341.33, 341.4, 341.41–341.44, 341.5

(56) References Cited

U.S. PATENT DOCUMENTS

| | | | | |
|---|---|---|---|---|
| 4,867,518 A | * | 9/1989 | Stamnitz et al. | 359/341.2 |
| 5,026,984 A | * | 6/1991 | Gerdt | 250/227.21 |
| 5,247,598 A | * | 9/1993 | Takimoto et al. | 385/99 |
| 6,535,684 B1 | * | 3/2003 | Kondo et al. | 385/137 |

FOREIGN PATENT DOCUMENTS

| | | | | | |
|---|---|---|---|---|---|
| JP | 08227017 A | * | 9/1996 | | G02B/6/00 |
| WO | WO 9938041 A1 | * | 7/1999 | | G02B/6/00 |

OTHER PUBLICATIONS

Patent Abstract of Japan and Machine Translation for Publication No. 08–227017, Sep. 3, 1996.*

* cited by examiner

Primary Examiner—Michelle R. Connelly-Cushwa
(74) Attorney, Agent, or Firm—Birch Stewart Kolasch & Birch LLP (57) ABSTRACT

The present invention includes a sheet material, a first optical fiber, a second optical fiber optically coupled to the first optical fiber in portions thereof, and an optical fiber coupler constituted in the portions where the two optical fibers are coupled, and those of the first and second optical fibers, and the optical fiber coupler are integrally held in the sheet material.

16 Claims, 13 Drawing Sheets

OPTICAL FIBER HOLDING STRUCTURE

FIELD OF THE INVENTION

The present invention relates to a holding structure for collectively holding portions constituting an optical fiber coupler in which a lengthy optical fiber is coupled to other optical fibers.

BACKGROUND OF THE INVENTION

Generally, in an optical fiber amplifier or an optical fiber gyroscope, a lengthy optical fiber is used as an amplifying device and a detecting device thereof.

For the lengthy optical fiber, a case occurs in that an optical fiber coupler needs to be provided to perform synthesizing processing and dividing processing. The lengthy optical fiber coupler is formed such that a sidewall of an optical fiber is spliced to a sidewall of another optical fiber according to, for example, a method of abrasion extention or mechanical splice.

Figure 25:
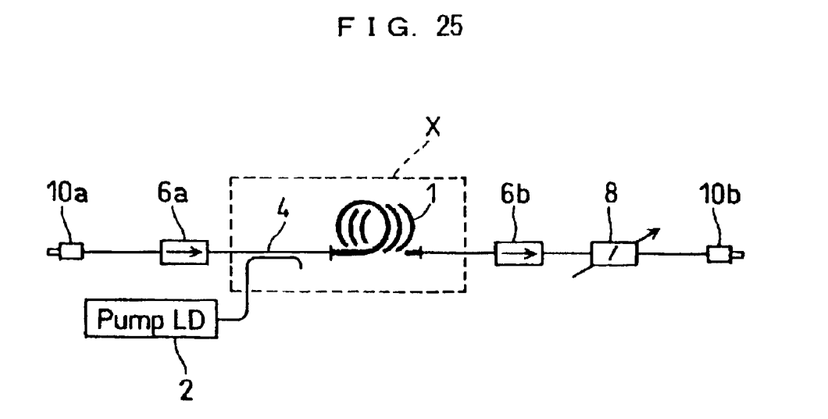
FIG. 25 is a configuration view of a forward pumping optical fiber amplifier.

A device formed by combining a lengthy optical fiber and an optical fiber coupler, as described above, will be described in detail with reference to various example optical fiber amplifiers shown in FIGS. 25 to 27. The optical fiber amplifier shown in FIG. 25 is of a known forward pumping type. In this amplifier, pumping light is entered from the input side of signal light that is fed to an amplification optical fiber.

Referring to FIG. 25, reference numeral 1 denotes an amplification optical fiber. The amplification optical fiber 1 directly amplifies signal light by using stimulated output effects. Reference numeral 2 denotes an pumping light source generating pumping light that excites the amplification optical fiber 1. The pumping light source 2 is formed of, for example, a laser diode. Reference numeral 4 denotes an optical fiber coupler sending the pumping light to the amplification optical fiber 1. Reference numerals 6a and 6b individually denote isolators 6a and 6b passing the signal light only in the unidirection. The isolator 6a and 6b each perform pass through restricting processing for the signal light to prevent parasitic oscillation attributable to end face reflection and to thereby reduce noise. Reference numeral 8 denotes a bandpass filter, which is shown of removing noise component light and thereby passing only signal light. Reference numerals 10a and 10b denote an input connector and an output connector, respectively.

In the above described configuration, for example, a 1.55-$\mu$m wavelength signal light to be input on the connector 10a is passed through the isolator 6a and the optical fiber coupler 4 and is then input on the amplification optical fiber 1. Concurrently, pumping light (for example, 1.48-$\mu$m wavelength light) output from the pumping light source 2 is input on the amplification optical fiber 1 via the amplification optical fiber 1.

The amplification optical fiber 1 is excited by the pumping light and is thereby brought into a inversion state. When the signal light is input on the amplification optical fiber 1 in the aforementioned state, the amplification optical fiber 1 amplifies the signal light according to the stimulated output. The amplified signal light is passed through the isolator 6b and the bandpass filter 8, and is then emitted from the output connector 10b.

Figure 26:
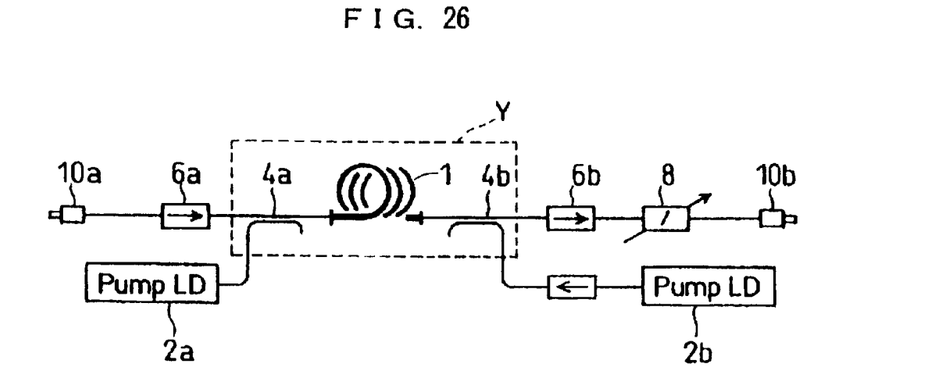
FIG. 26 is a configuration view of a bidirectional pumping optical fiber amplifier.

An optical fiber amplifier shown in FIG. 26 is of a known bidirectional pumping type. In this amplifier, pumping light is entered from both the input and output sides of the signal light that is fed to the amplification optical fiber 1. Optical fiber couplers 4a and 4b are provided respectively before and behind the amplification optical fiber 1; and pumping light sources 2a and 2b are provided respectively before and behind the amplification optical fiber 1.

Figure 27:
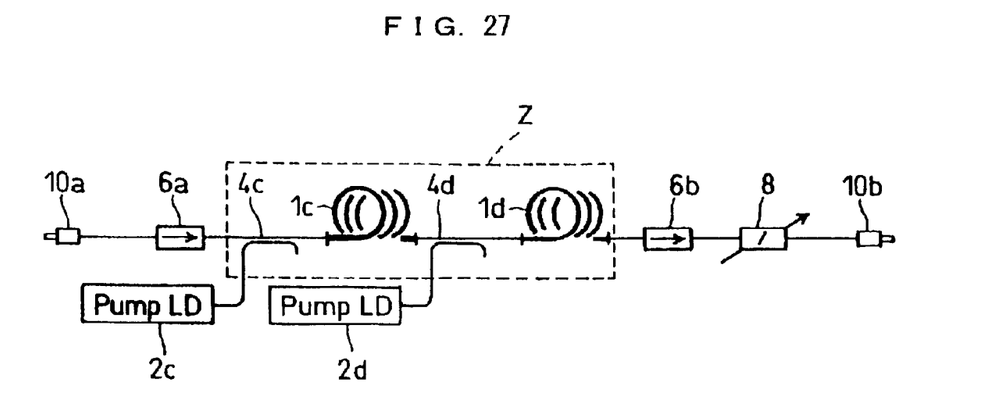
FIG. 27 is a configuration view of a double stage pumping optical fiber amplifier.

An optical fiber amplifier shown in FIG. 27 is of a known double stage exciting type. In this amplifier, two amplification optical fibers 1c and 1d are serially connected, and pumping light sources 2c and 2d are provided respectively for the amplification optical fibers 1c and 1d via optical fiber couplers 4c and 4d.

In the optical fiber amplifiers shown in FIG. 25 to 27, lengthy optical fibers are used for the amplification optical fibers 1, 1c, and 1d to individually obtain predetermined amplifier gains without causing deterioration in material properties of the amplification optical fibers 1, 1c, and 1d. When assembling the optical fiber amplifier by the aforementioned lengthy optical fibers, individual optical components need to be integrated at a highest possible structural density for storing into the device.

Ordinarily, the optical fiber coupler 4, 4a, 4b, 4c, or 4d is formed in the following manner to form the amplification optical fiber 1, 1c, or 1d to be an integrated form. The amplification optical fiber is wound about a small bobbin (not shown). Other optical fibers are abrasion spliced to the end portions of the amplification optical fibers 1, 1c, or 1d wounded on the small bobbin. The optical fiber coupler 4, 4a, 4b, 4c, or 4d is formed by abrasion splicing other optical fibers to the end portions of the amplification optical fibers 1, 1c, or 1d.

The optical fiber coupler 4, 4a, 4b, 4c, or 4d needs to be disposed along a straight line. As such, the optical fiber coupler 4, 4a, 4b, 4c, or 4d cannot be wound about the winding bobbin of the amplification optical fibers 1, 1c, or 1d. For this reason, the optical fiber coupler 4, 4a, 4b, 4c, or 4d is independently mounted in a portion near the bobbin and is then immobilized therein.

However, when the bobbin is used, and in addition, the optical fiber coupler 4, 4a, 4b, 4c, or 4d are fixed, the configuration area becomes voluminous; and as such, miniaturization cannot be cannot be implemented, and problems occur in that much time is required for, for example, wiring and disposal of the components.

SUMMARY OF THE INVENTION

A primary object of the present invention is to provide an optical fiber holding structure not only to enable an overall lengthy optical fiber to be handled integrally without causing the fiber to be unwound, but also to enable an optical fiber coupler to be integrally held stably and compactly.

Other objects, features, and advantages of the present invention will be clarified parent from the description given below.

In summary, the present invention (optical fiber holding structure) is characterized by including a sheet material, a first optical fiber, and a second optical fiber optically coupled to the first optical fiber in portions thereof, wherein the mutually coupled portions of the first and second optical fibers constitute an optical fiber coupler, and the sheet material integrally holds portions including those of the first optical fiber, the second optical fibers, and the optical fiber coupler.

Preferably, the optical fiber holding structure has a configuration made such that the optical fiber coupler is inserted into a fixing guard tube and the optical fibers together are enclosed by the sheet material.

According to the present invention, the configuration is made such that the sheet material integrally holds not only the lengthy optical fiber but also the optical fiber coupler to be compact and stable. This facilitates handling of the structure in assembly into a device. In addition, the optical fiber coupler is integrally fixed to the sheet material and is small. As such, unlike a conventional case, the necessity of independently mounting an optical fiber coupler onto, for example, a substrate can be obviated. Moreover, since externally extending portions of the optical fibers are provided to extend out of the sheet material, the optical fiber holding structure can easily be connected to various devices. In addition, since the optical fiber coupler is inserted into the fixing guard tube, portions of the optical fiber coupler can sufficiently be protected without causing adverse effects for miniaturization.

The fixing guard tube preferably includes a main body having a stowing opening formed along a longitudinal direction of the optical fibers, and a lid for closing the stowing opening. Thereby, the configuration of the fixing guard tube is simplified.

Preferably, pumping light is entered into the first optical fiber, and signal light is entered into the second optical fiber. This enables the optical fiber holding structure to function as an optical fiber amplifier.

In addition, longitudinal optical fiber portions of the first optical fiber are preferably wound and disposed race track-shaped (in combination shape of half round and straight line). Thereby, the first optical fiber is stowed even more compactly. In this case, the optical fiber portions to be wound and disposed elliptic are preferably disposed not to overlap with one another along the thickness direction of the sheet material. Thereby, a stowing structure for the first optical fiber is simplified. Moreover, in the above described case, the optical fiber portions to be wound and disposed elliptic are laminated to one another along the thickness direction of the sheet material. Thereby, since the first optical fiber is stowed even more compactly, the occupational area thereof is further reduced.

Preferably, an end portion of at least one of the first and second optical fibers is extended out of the sheet material. This further facilitates the connection between the optical fiber extended out of the sheet material and another optical fiber.

End portions of the first and second optical fibers are preferably extended out of the sheet material. This further facilitates connection between the first and second optical fibers and other optical fiber.

Preferably, the first and second optical fibers are extended out from the same end portion of the sheet material. This enables the two optical fibers and the other optical fibers to be connected in the same portion of the sheet material. Accordingly, the work efficiency of connection is improved.

The first optical fiber is preferably an amplification optical fiber. Thereby, the optical fiber holding structure functions as an optical fiber amplifier. In this case, preferably, a portion of the second optical fiber is optically coupled to one end portion of the first optical fiber. Thereby, the optical fiber holding structure functions either as a forward pumping optical fiber amplifier or as a rearward pumping optical fiber amplifier.

It is preferable that another optical fiber be abrasion spliced to one end portion of the first optical fiber, and the another optical fiber and the second optical fiber be optically coupled in portions. Thereby, what is optically coupled to the second optical fiber is another optical fiber. As such, the necessity of securing an optical fiber area for optically coupling to the first optical fiber is obviated. Thereby, the fiber length of the first optical fiber can be secured at any event.

In addition, preferably, second optical fibers are optically coupled in portions to individual two end portions of the first optical fiber. Thereby, the optical fiber holding structure functions as a bidirectional pumping optical fiber amplifier. In this case, it is preferable that the two end portions of the first optical fiber be mutually laminated along the thickness direction of the sheet material, and the second optical fibers optically coupled to individual two end portions of the first optical fiber are extended out together from the same portion of the sheet material. Thereby, since a pair of second optical fibers to be provided is extended from the same end portion, the circuit arrangement for the second optical fiber is facilitated.

Moreover, preferably, the optical fiber holding structure includes a plurality of optical fiber configurations each comprising the first optical fiber and the second optical fiber, and the optical fiber coupler, and the sheet material integrally holds the plurality of optical fiber configurations. This enables the optical fiber holding structure to be further miniaturized. In the above described case, it is more preferable that the plurality of optical fiber configurations be laminated together in the thickness direction of the sheet material. Thereby, the optical fiber holding structure is even more miniaturized.

BRIEF DESCRIPTION OF THE DRAWINGS

The above and other objects as well as advantages of the invention will become clear by the following description of preferred embodiments of the invention with reference to the accompanying drawing, wherein.

In all these figures, like components are indicated by the same numerals.

DETAILED DESCRIPTION OF THE PREFERRED EMBODIMENTS

Hereinbelow, the present invention will be described in detail with reference to embodiments shown in the drawings.

Each of the embodiments will be described referring to an example that collectively holds the portions of the optical fiber(s) and the optical fiber coupler(s) that constitute the optical fiber amplifier shown in each of FIGS. 25 to 27.
(First Preferred Embodiment)

Figure 1:
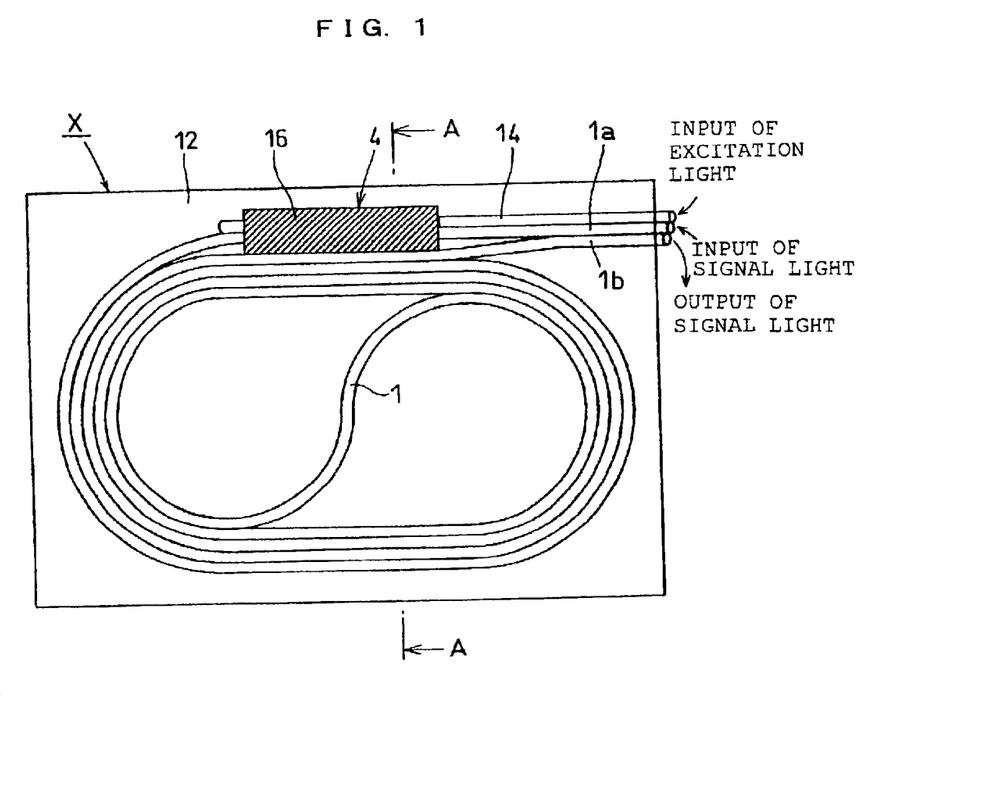
FIG. 1 is a plan view of an optical fiber holding structure according to a first preferred embodiment of the present invention.
Figure 2:
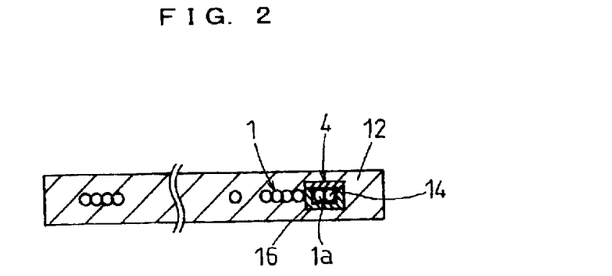
FIG. 2 is a cross sectional view along the line A—A of FIG. 1.
Figure 3:
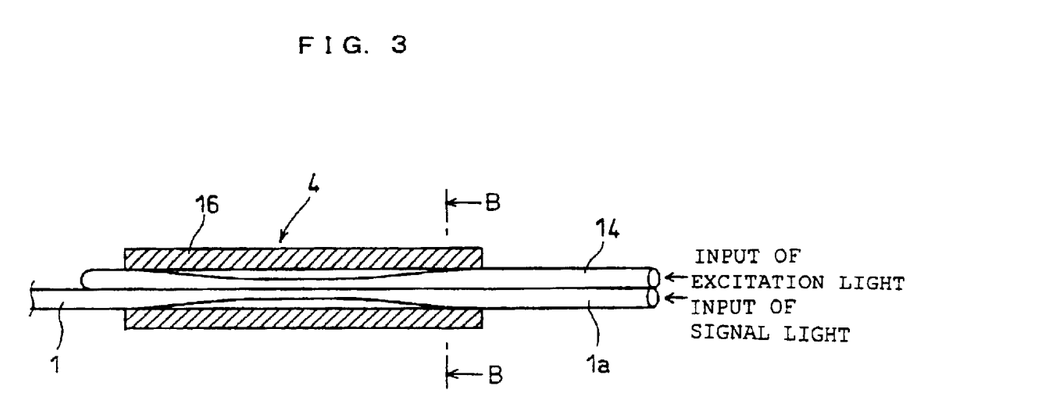
FIG. 3 is a cross sectional view of portions of an optical fiber coupler in the structure shown in FIG. 1.
Figure 4:
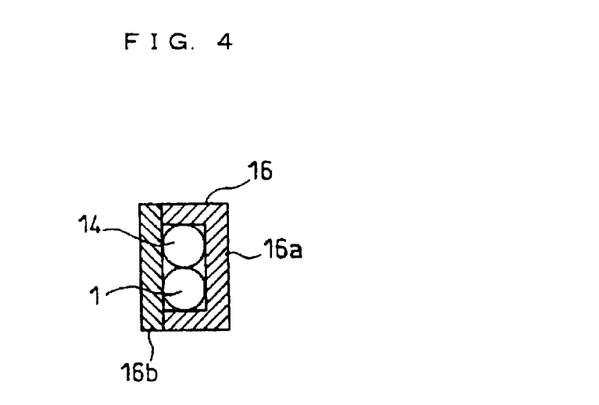
FIG. 4 is a cross sectional view along the line B—B of FIG. 3.

FIG. 1 is a plan view of an optical fiber holding structure according to a first preferred embodiment. FIG. 2 is a cross sectional view along the line A—A of FIG. 1. FIG. 3 is a cross sectional view of portions of an optical fiber coupler shown in FIG. 1. FIG. 4 is a cross sectional view along the line B—B of FIG. 3.

A portion shown by symbol X in the forward pumping optical fiber amplifier shown in FIG. 25 is integrated in the optical fiber holding structure of the first embodiment. More specifically, in the first embodiment, an amplification optical fiber 1, a quartz based optical fiber 14, and an optical fiber coupler 4 are integrated with a sheet material 12. In the present embodiment, the amplification optical fiber 1 forms a first optical fiber, and the quartz based optical fiber 14 forms a second optical fiber.

The amplification optical fiber 1 is disposed on a same plane such that fiber portions thereof are adjacently separated from one another in a planar direction so as not to intersect with one another. Thus, the amplification optical fiber 1 is wound elliptic on the same plane. Concurrently, the fiber portions of the amplification optical fiber 1 that extend along the longitudinal direction are disposed in the form of a single layer in the direction of the thickness of the sheet material 12 provided perpendicular to the plane on which the amplification optical fiber 1 is spirally disposed. That is, the fiber portions are disposed not to overlap with each in the aforementioned direction. The above described optical fiber layout structure is called "single layer winding".

An end portion 1a on the one side of the amplification optical fiber 1 is extended out of the sheet material 12 via the optical fiber coupler 4. Also, an end portion 1b on the other side of the amplification optical fiber 1 is extended out of the sheet material 12.

A sidewall of the quartz based optical fiber 14 is optically coupled to a sidewall of the end portion 1a of the amplification optical fiber 1. The optical coupling is performed using a method of, for example, abrasion extension. The optical fiber coupler 4 is constituted of sidewalls of the optically coupled end portion 1a of the amplification optical fiber 1 and the quartz based optical fiber 14.

The optical fiber coupler 4 is inserted into a fixing guard tube 16. The fixing guard tube 16 and the amplification optical fiber 1 are enclosed by the sheet material 12. One end portion of the quartz based optical fiber 14 is extended out of the sheet material 12. The one end portion of the quartz based optical fiber 14 and the end portion 1a of the amplification optical fiber 1 extend from the same end portion of the sheet material 12 along the same direction.

As shown FIGS. 2 and 3, the fixing guard tube 16 is formed of a material having properties that does not damage portions of the optical fiber coupler 4 and that has a low form variability. Materials of this type include, for example, rigid resin and glass. The fixing guard tube 16 includes a main body 16a and a lid 16b, in which the main body 16a includes a stowing opening formed along the longitudinal direction of the optical fiber. After a abrasion spliced portion of the optical fiber coupler 4 is stowed into the main body 16a, the opening of the main body 16a is then closed with the lid 16b.

The sheet material 12 is formed of, for example, a silicon based resin. The silicon based resin has advantageous in that, for example, it does not change in quality and is stable for a long time. Other materials usable to form the sheet material 12 include urethane based rubber, UV resin, epoxy resin, polyester resin, polypropylene resin, and polyethylene resin.

In the optical fiber holding structure shown in FIGS. 1 to 4, the sheet material 12 compactly and stably holds the lengthy amplification optical fiber 1 and the optical fiber coupler 4. As such, the optical fiber holding structure can easily be handled in assembly thereof when it is built into a device. In particular, the optical fiber coupler 4 is integrally fixed to the sheet material 12 and is miniaturized. This avoids the necessity of dedicatedly fixing the optical fiber coupler 4.

In addition, the individual amplification optical fiber 1 and the quartz based optical fiber 14 are extended out of the sheet material 12. This facilitates coupling of, for example, the pumping light source 2 and the isolators 6a and 6b, to the amplification optical fiber 1 and the quartz based optical fiber 14.
(Second Preferred Embodiment)

Figure 5:
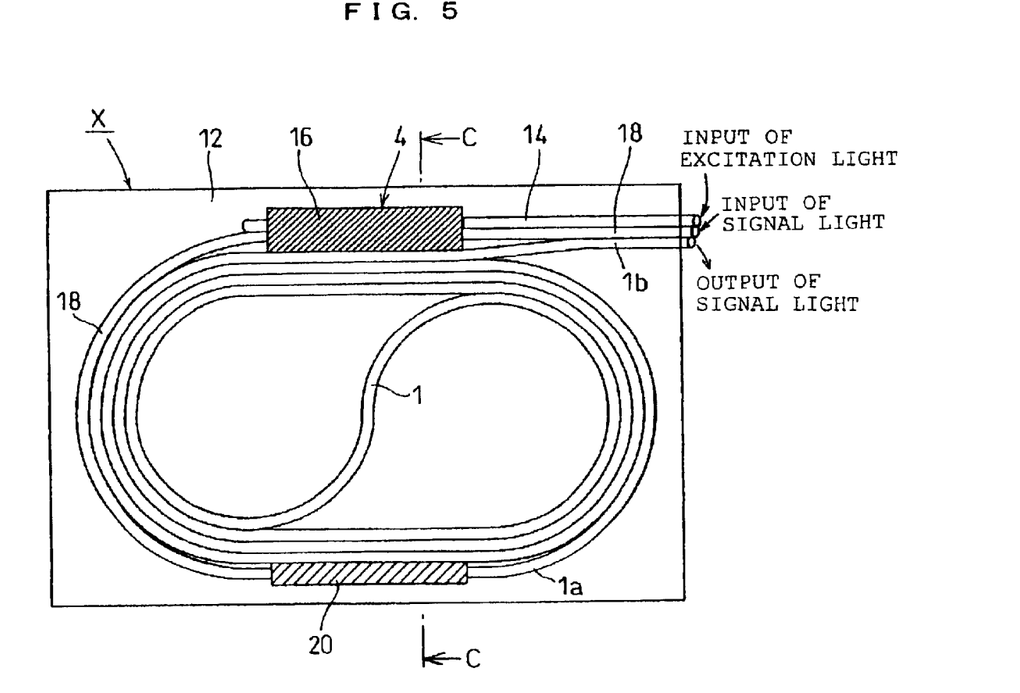
FIG. 5 is a plan view of an optical fiber holding structure according to a second preferred embodiment of the present invention.
Figure 6:
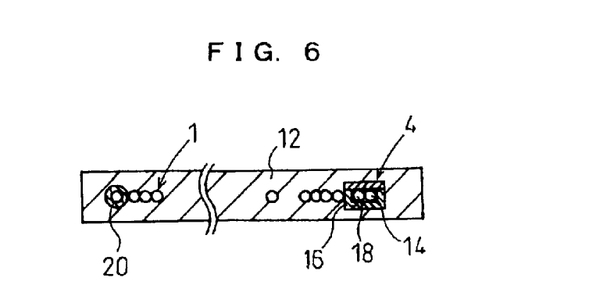
FIG. 6 is a cross sectional view along the line C—C of FIG. 5.
Figure 7:
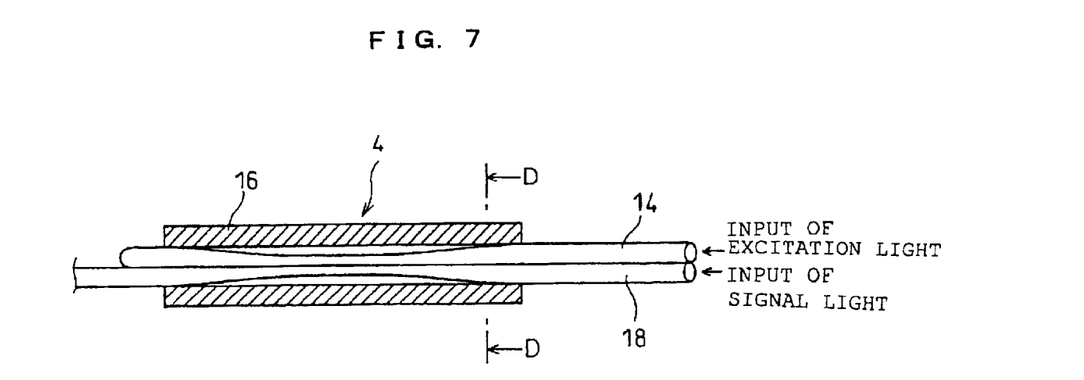
FIG. 7 is a cross sectional view of portions of an optical fiber coupler in the structure shown in FIG. 5.
Figure 8:
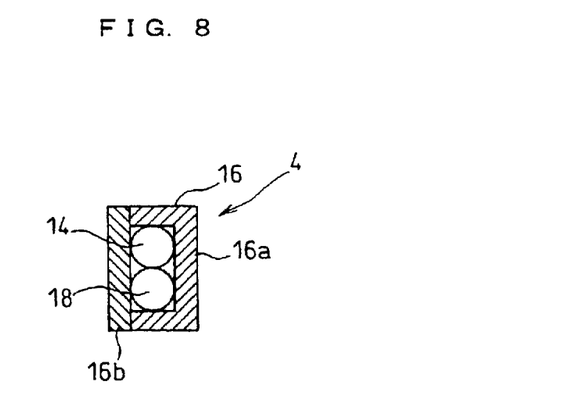
FIG. 8 is a cross sectional view along the line D—D of FIG. 3.

FIG. 5 is a plan view of an optical fiber holding structure according to a second embodiment. FIG. 6 is a cross sectional view along the line C—C of FIG. 5. FIG. 7 is a cross sectional view of portions of an optical fiber coupler shown in FIG. 5. FIG. 8 is a cross sectional view along the line D—D of FIG. 3.

The portion shown by symbol X in the forward pumping optical fiber amplifier shown in FIG. 25 is integrated in the optical fiber holding structure of the second embodiment.

In the second embodiment, one end portion of another externally extending optical fiber 18 formed of quartz base glass is abrasion spliced to the end portion 1a of the amplification optical fiber 1. In a portion 20 of the abrasion splice, coatings of the amplification optical fiber 1 and the optical fiber 18 are once removed to perform the abrasion splice. As such, the abrasion spliced portion 20 is coated anew for protection with the same material as the coating of the optical fibers 1 and 18. The other end portion of the optical fiber 18, which is abrasion spliced to the amplification optical fiber 1, is extended out of the sheet material 12 via the optical fiber coupler 4.

The optical fiber coupler 4 is configured such that a sidewall of the quartz based optical fiber 14 is optically coupled using, for example, a abrasion extension method, to a portion of the optical fiber 18.

Other configuration portions are similar to those of the first embodiment shown in FIGS. 1 to 4. Hence, detailed descriptions thereof are omitted herefrom.

Since the optical fiber 18 is provided, the second embodiment provides the following operational advantages in addition to the operational advantages of the first embodiment. More specifically, suppose a defect has occurred in abrasion spliced states of the two quartz based optical fibers 14 and 18, and re-abrasion splice needs to be performed. Even in this case, although the length of the optical fiber 18 is reduced by the re-splicing work, the overall length of the amplification optical fiber 1 is not changed thereby. As such, a desired gain is always secured.

(Third Preferred Embodiment)

Figure 9:
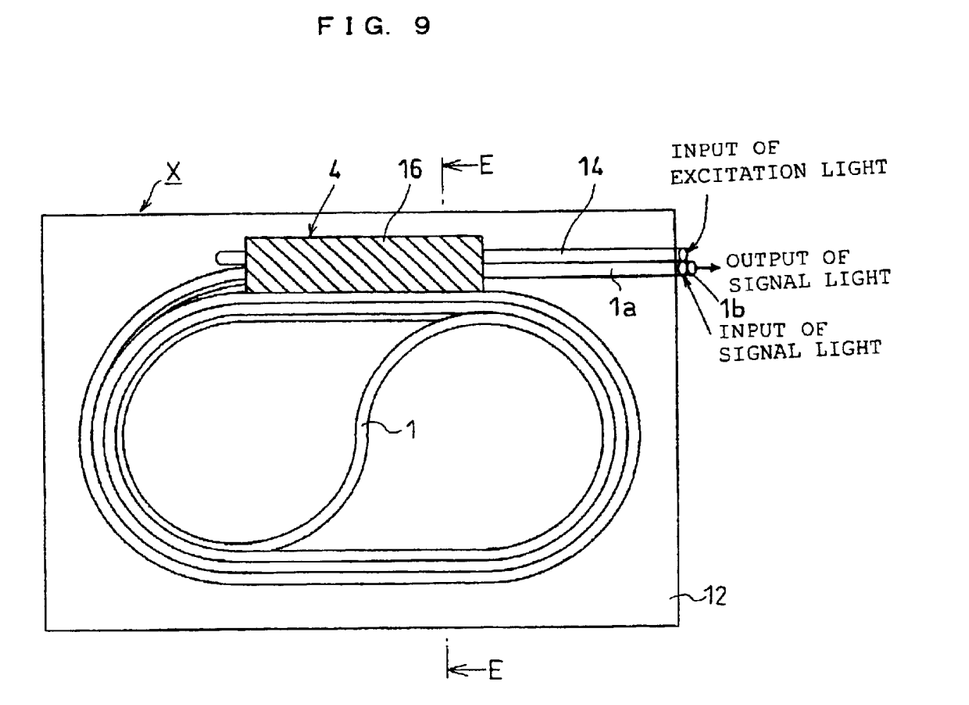
FIG. 9 is a plan view of an optical fiber holding structure according to a third preferred embodiment of the present invention.
Figure 10:
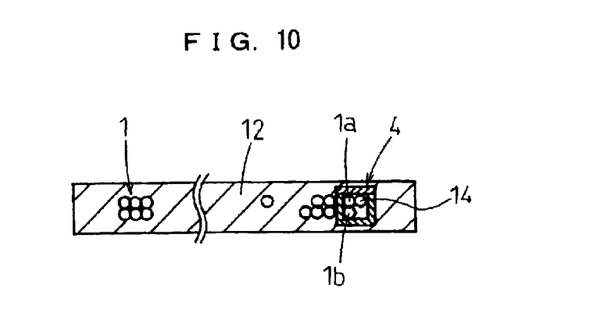
FIG. 10 is a cross sectional view along the line E—E of FIG. 9.
Figure 11:
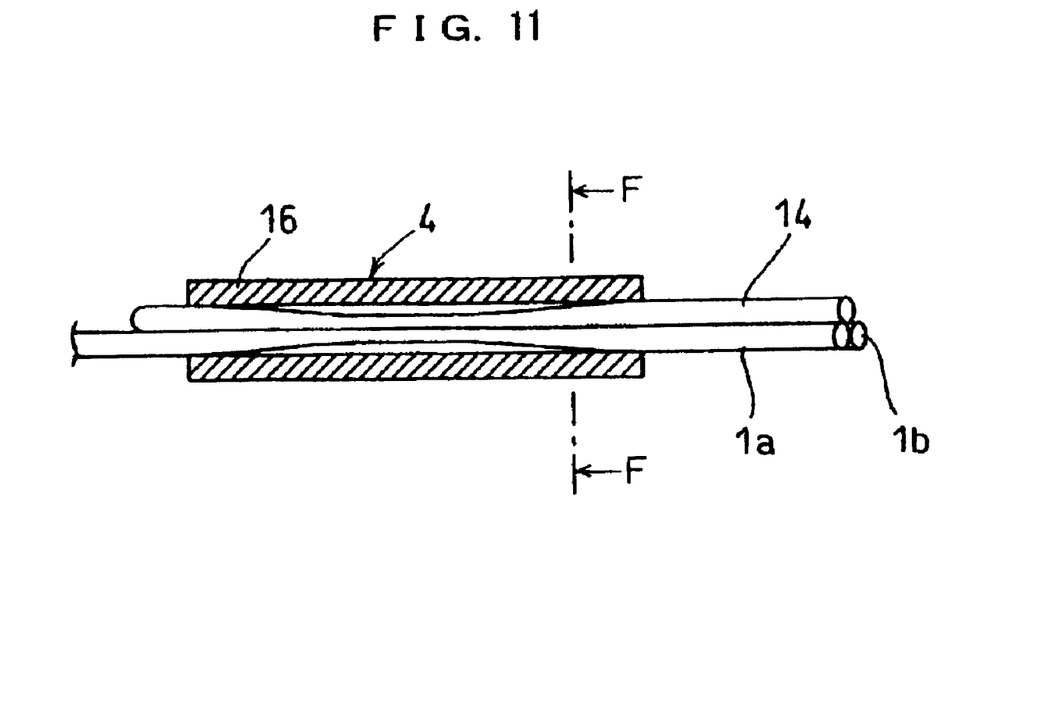
FIG. 11 is a cross sectional view of portions of an optical fiber coupler in the structure shown in FIG. 9.
Figure 12:
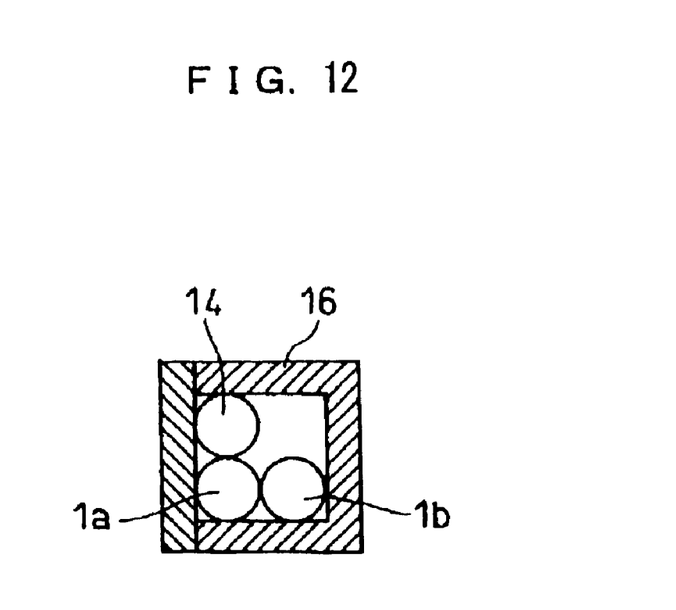
FIG. 12 is a cross sectional view along the line F—F of FIG. 3.

FIG. 9 is a plan view of an optical fiber holding structure according to a third embodiment. FIG. 10 is a cross sectional view along the line E—E of FIG. 9. FIG. 11 is a cross sectional view of portions of an optical fiber coupler shown in FIG. 9. FIG. 12 is a cross sectional view along the line F—F of FIG. 3.

As in the first embodiment, the portion shown by symbol X in the forward pumping optical fiber amplifier shown in FIG. 25 is integrated in the optical fiber holding structure of the third embodiment.

In the third preferred embodiment, the amplification optical fiber 1 is wound elliptic such that fiber portions thereof are adjacently separated from one another in the planar direction. In addition, in the third preferred embodiment, a plurality of fiber portions wound elliptic are provided along the longitudinal direction of the amplification optical fiber 1. In the FIG. 9, two sets of wound fiber portions are provide as an example. These sets of wound fiber portions are laminated in the thickness direction of the sheet material 12. The laminated wound fiber portions are integrated with the sheet material 12. The above described optical fiber layout structure is called "multilayer winding".

In the third preferred embodiment, a sidewall of the ordinary optical fiber 14 is optically coupled to a sidewall of the end portion 1a of the amplification optical fiber 1 by using, for example, a abrasion extension method. The optical fiber coupler 4 is constituted of sidewalls of the optically coupled end portion 1a of the amplification optical fiber 1 and the quartz based optical fiber 14. The optical fiber coupler 4 and the end portion 1b of the amplification optical fiber 1 are inserted into the fixing guard tube 16.

Other configuration portions are similar to those of the first embodiment shown in FIGS. 1 to 4; hence, detailed descriptions thereof are omitted herefrom.

In the third embodiment, since the amplification optical fiber 1 is disposed in the form of the multilayer winding, the dimension in the thickness direction of the sheet material 12 is increased by a fine increment in comparison to the single layer winding structure. While the increment in the thickness is fine, the occupational area can significantly be reduced. For this reason, the structural density can be enhances in the third embodiment.

(Fourth Preferred Embodiment)

Figure 13:
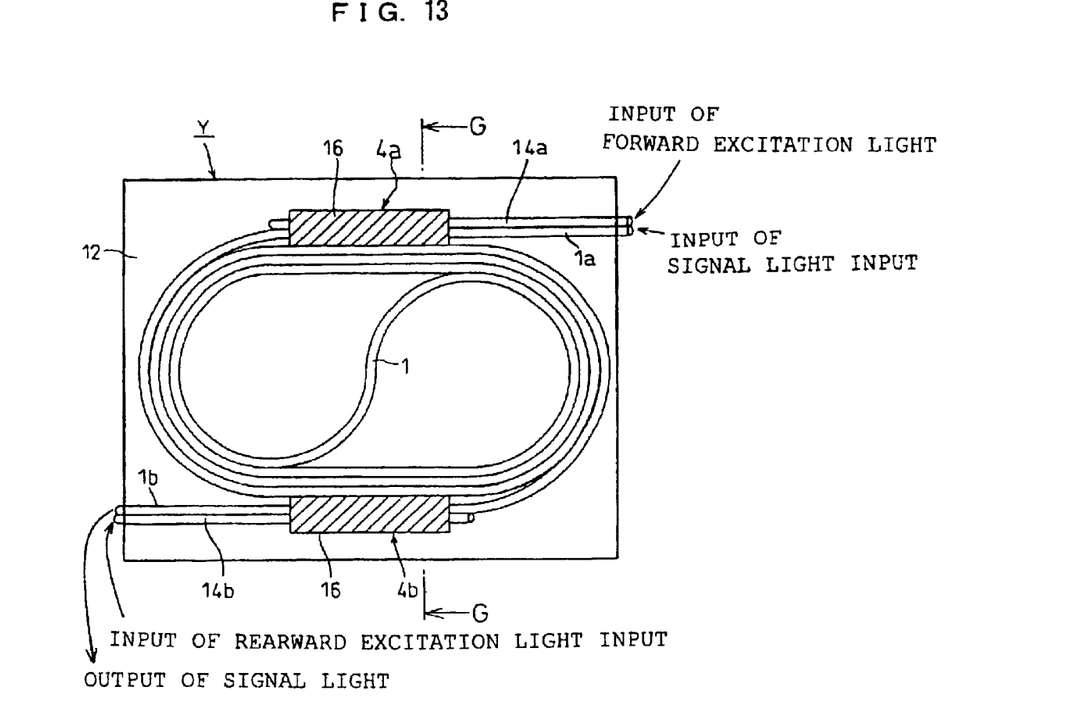
FIG. 13 is a plan view of an optical fiber holding structure according to a fourth preferred embodiment of the present invention.
Figure 14:
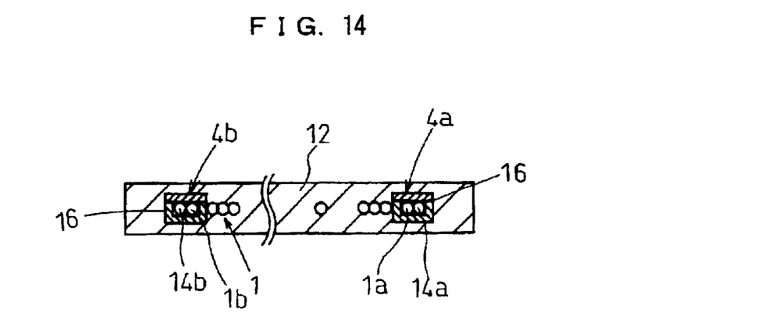
FIG. 14 is a cross sectional view along the line G—G of FIG. 13.
Figure 15:
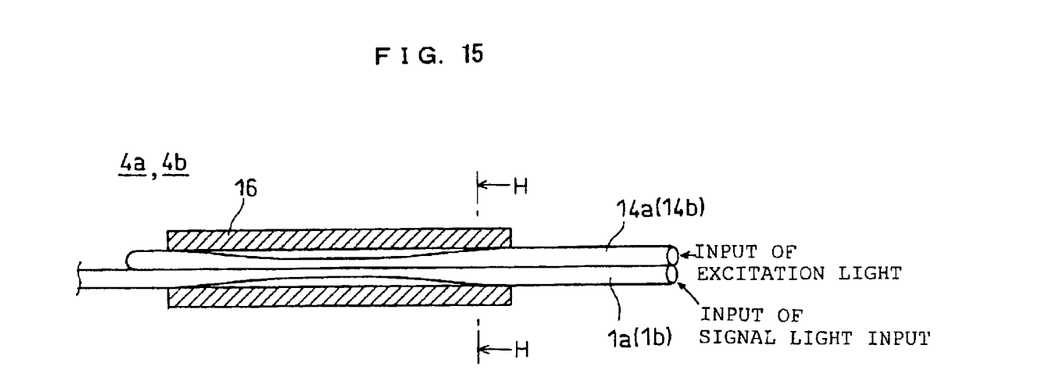
FIG. 15 is a cross sectional view of portions of an optical fiber coupler in the structure shown in FIG. 13.
Figure 16:
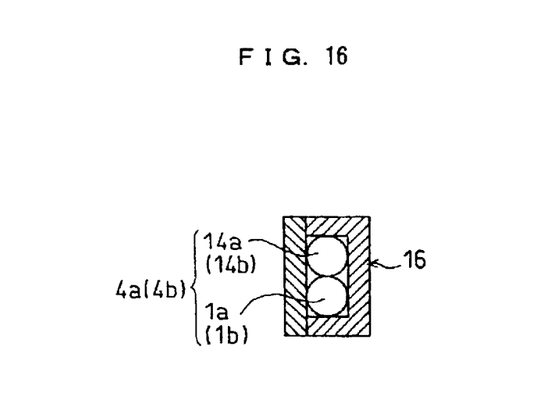
FIG. 16 is a cross sectional view along the line H—H of FIG. 15.

FIG. 13 is a plan view of an optical fiber holding structure according to a fourth embodiment. FIG. 14 is a cross sectional view along the line G—G of FIG. 13. FIG. 15 is a cross sectional view of portions of an optical fiber coupler shown in FIG. 13. FIG. 16 is a cross sectional view along the line H—H of FIG. 15.

A portion shown by symbol Y in the bidirectional pumping optical fiber amplifier shown in FIG. 26 is integrated in the fourth embodiment.

In specific, in the fourth embodiment, the amplification optical fiber 1 is disposed in the form of the single layer winding. Two end portions 1a and 1b of the amplification optical fiber 1 are extended out of the sheet material 12 via the respective optical fiber couplers 4a and 4b in mutually different directions (right and left directions as viewed on the drawing). The first embodiment is referenced for the single layer winding.

Sidewalls of quartz based optical fibers 14a and 14b are optically coupled to sidewalls of the respective end portions 1a and 1b of the amplification optical fiber 1 by using, for example, a abrasion extension method. The optical fiber couplers 4a and 4b are constituted of sidewalls of the end portions 1a and 1b and the quartz based optical fibers 14a and 14b. The optical fiber couplers 4a and 4b are individually inserted into the fixing guard tubes 16.

(Fifth Preferred Embodiment)

Figure 17:
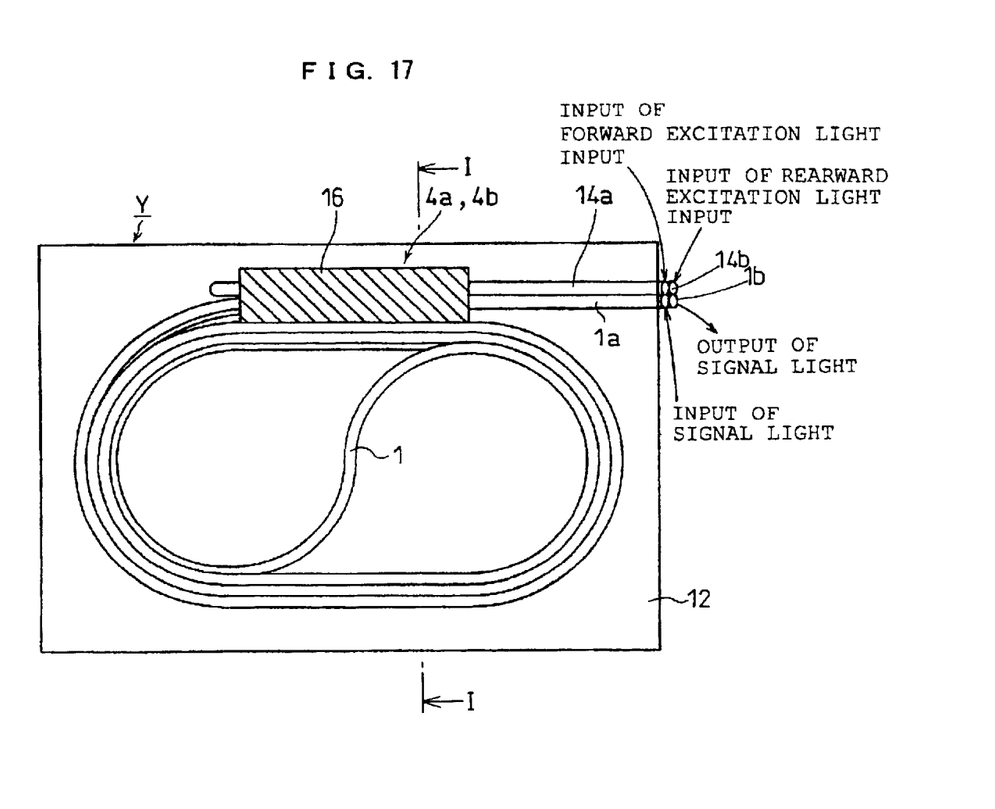
FIG. 17 is a plan view of an optical fiber holding structure according to a fifth preferred embodiment of the present invention.
Figure 18:
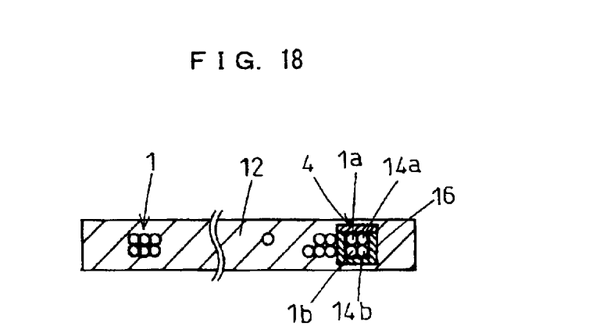
FIG. 18 is a cross sectional view along the line I—I of FIG. 17.
Figure 19:
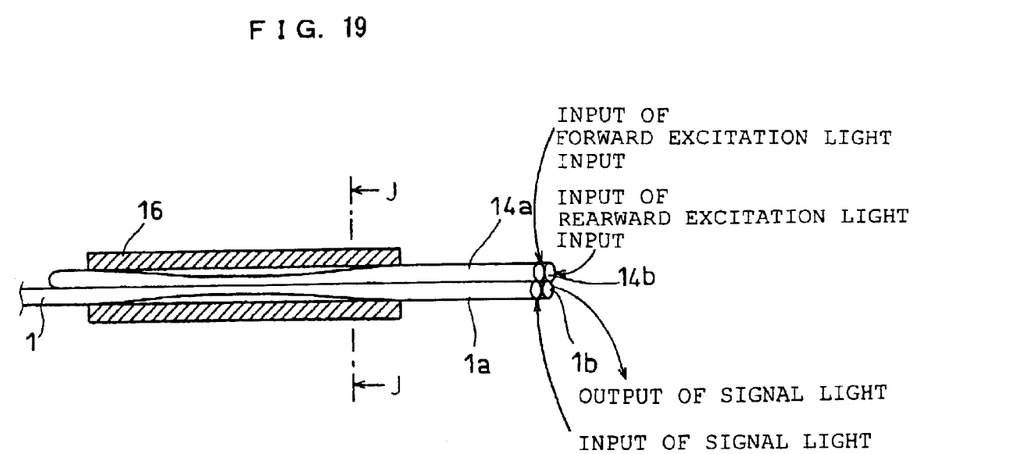
FIG. 19 is a cross sectional view of portions of an optical fiber coupler in the structure shown in FIG. 17.
Figure 20:
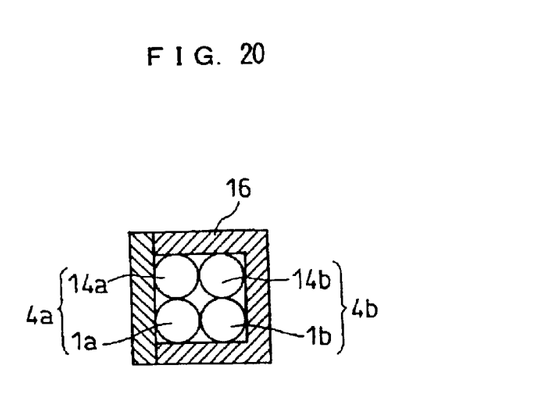
FIG. 20 is a cross sectional view along the line J—J of FIG. 19.

FIG. 17 is a plan view of an optical fiber holding structure according to a fifth embodiment. FIG. 18 is a cross sectional view along the line I—I of FIG. 17. FIG. 19 is a cross sectional view of portions of an optical fiber coupler shown in FIG. 17. FIG. 20 is a cross sectional view along the line J—J of FIG. 19.

As in the fourth embodiment, the portion shown by symbol Y in the bidirectional pumping optical fiber amplifier shown in FIG. 26 is integrated in the fifth embodiment.

In the fifth embodiment, the amplification optical fiber 1 is disposed in the form of the multilayer winding (specifically, a double-layer winding). Two end portions 1a and 1b of the amplification optical fiber 1 are extended out of the sheet material 12 via the respective optical fiber couplers 4a and 4b in same different directions (right direction as viewed on the drawing). The third embodiment is referenced for the single-layer winding.

The optical fiber couplers 4a and 4b are configured, respectively, such that sidewalls of the quartz based optical fibers 14a and 14b are optically coupled using, for example, a abrasion extension method, to sidewalls of the end portions 1a and 1b of the amplification optical fiber 1. Thus, each of the optical fiber couplers 4a and 4b is configured of the optically coupled portion. Both the optical fiber couplers 4a and 4b are inserted into the single fixing guard tube 16. The quartz based optical fibers 14a and 14b are together extended out of the sheet material 12 toward the same direction. The position in which the quarts based optical fibers 14a and 14b are extended out of the sheet material 12 is the same as that of the amplification optical fiber 1.

Other configuration portions are similar to those of the fourth embodiment shown in FIGS. 13 to 16. Hence, detailed descriptions thereof are omitted herefrom. As described above, since the amplification optical fiber 1 is disposed in the form of the multilayer winding, the occupational area thereof can significantly be reduced in comparison to the case of the single layer winding. Thereby, enhancement in the structural density can be expected.

(Sixth Preferred Embodiment)

Figure 21:
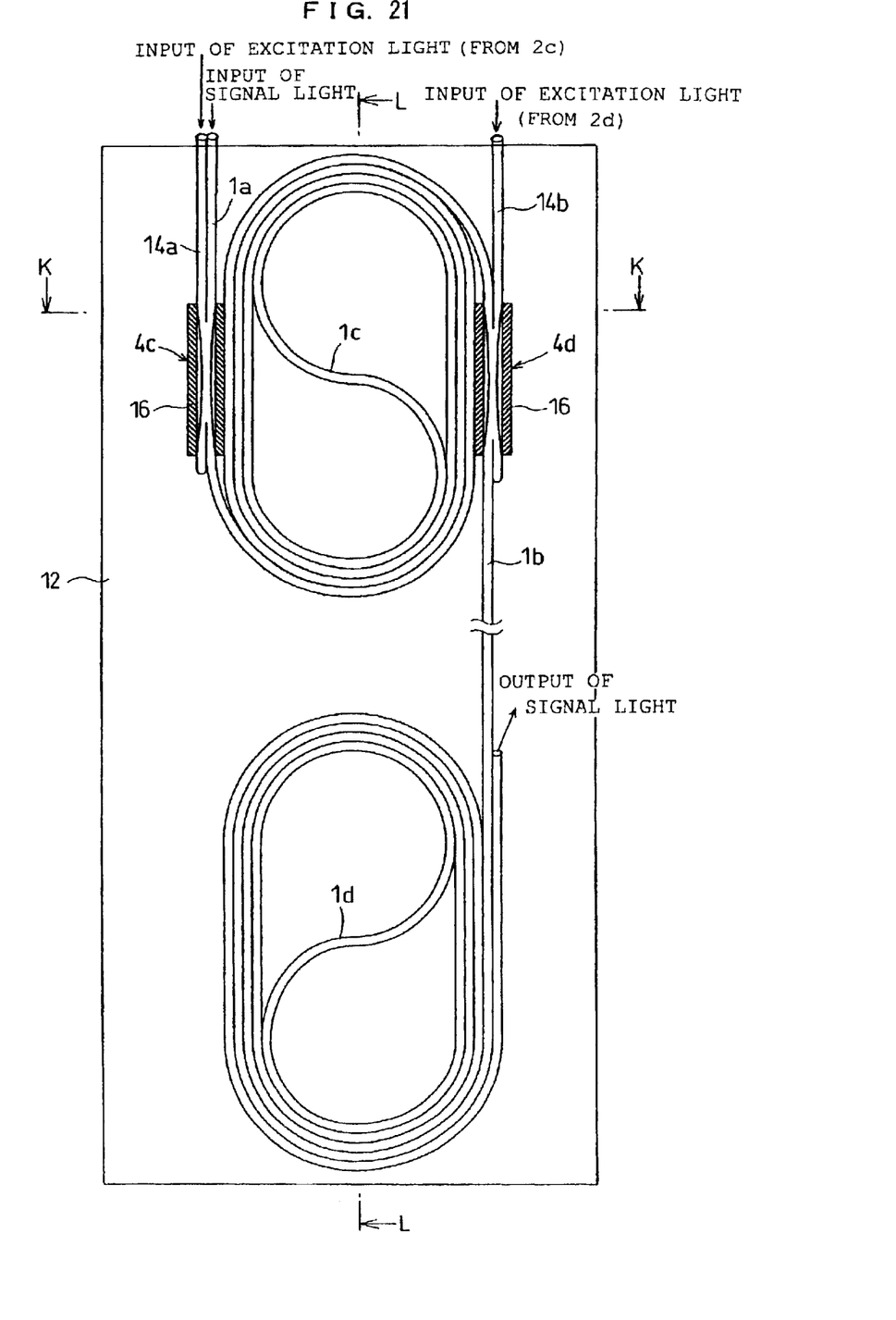
FIG. 21 is a plan view of an optical fiber holding structure according to a sixth preferred embodiment of the present invention.
Figure 22:
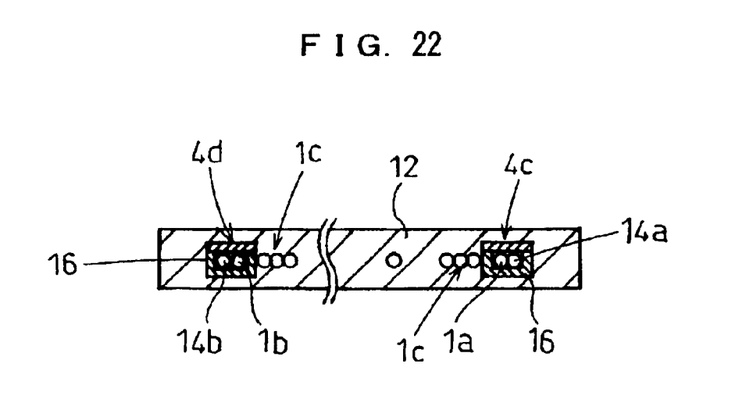
FIG. 22 is a cross sectional view along the line K—K of FIG. 21.
Figure 23:
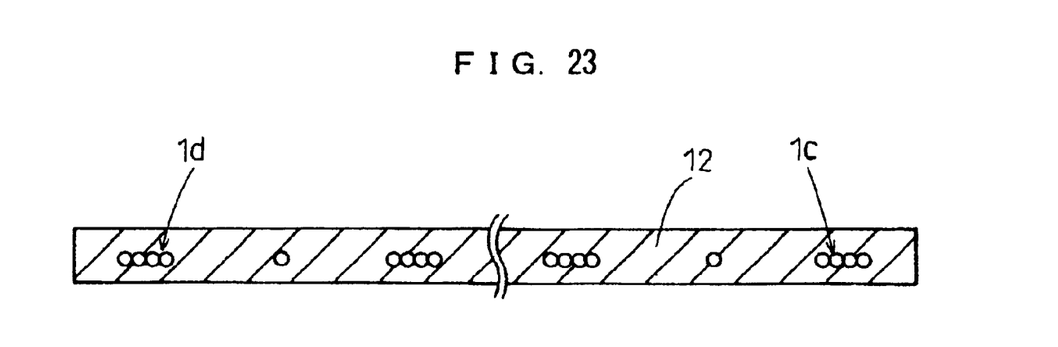
FIG. 23 is a cross sectional view along the line L—L of FIG. 21.

FIG. 21 is a plan view of an optical fiber holding structure according to a sixth embodiment. FIG. 22 is a cross sectional view along the line K—K of FIG. 21. FIG. 23 is a cross sectional view along the line L—L of FIG. 19. In these drawings, portions corresponding to those of the first embodiment shown in FIGS. 1 to 4 are shown with the same numeral/symbols. A portion shown by symbol Z in the bidirectional pumping optical fiber amplifier shown in FIG. 26 is integrated in the sixth embodiment. Specifically, the amplification optical fibers 1c and 1d are each disposed in the form of the single layer winding. For reference, the single layer winding is described in the first embodiment.

Sidewalls of the quartz based optical fibers 14a and 14b are optically coupled to sidewalls of two end portions 1a and 1b of the amplification optical fiber 1c and 1d of the amplification optical fiber 1c on the front side (upper side as viewed on the drawing). The sidewalls are optically coupled using, for example, a abrasion extension method. The optical fiber couplers 4c and 4d are configured of the optically coupled end portions 1a and 1b and quartz based optical fibers 14a and 14b. The optical fiber couplers 4c and 4d are individually inserted into the fixing guard tubes 16. The optical fiber couplers 4c and 4d and the respective fixing guard tubes 16 are integrated with the sheet material 12. The amplification optical fiber 1d on the rear side (lower side as viewed on the drawing) is fixed as it is to the sheet material 12.

Figure 24:
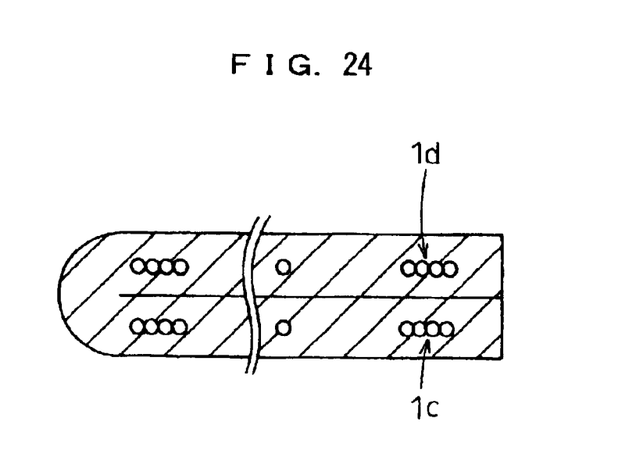
FIG. 24 is a cross sectional view of a modified example of the optical fiber holding structure according to the sixth preferred embodiment.

As shown in FIG. 24, integration may be implemented such that the amplification optical fibers 1c and 1d together with the sheet material 12 folded to overlap with each other and are thereby disposed. In the case, the miniaturization can further be promoted.

As above, in each of the embodiments shown in FIGS. 1 to 24, the present invention has been described with reference to the configuration in which the present invention was carried out with each of the optical fiber amplifiers shown in FIGS. 25 to 27. However, the present invention is not limited to the above described applications. For example, the present invention may also be implemented with a known rearward pumping optical fiber amplifier in which pumping light is entered from the output side of signal light that is fed to an amplification optical fiber.

Moreover, in each of the embodiments, description has been made regarding the examples in which the amplification optical fiber is disposed in the form of the single layer or in the form of two layers laminated. However, the amplification optical fiber may be disposed in the form of a larger number of layers laminated.

Furthermore, the present invention is not limited to the optical fiber amplifier of each of the embodiments. The present invention may widely be applied to a variety of configurations including an optical fiber coupler provided to implement optical synthesis and division for a lengthy optical fiber of a different type, such as an optical laser.

While there has been described what is at present considered to be preferred embodiments of this invention, it will be understood that various modifications may be mad therein, and it is intended to cover in the appended claims all such modifications as fall within the true spirit and scope of this invention.

What is claimed is:

1. An optical fiber holding structure comprising:
   a sheet material;
   a first optical fiber; and
   a second optical fiber optically coupled to the first optical fiber in portions thereof to synthesize or divide the wavelengths of the light in said first and second optical fibers;
   a fixing guard tube;
   wherein:
   the first and second optical fibers constitutes an optical fiber coupler in the mutually coupled portions thereof and the optical fiber coupler is integrally held in the sheet material;
   the optical fiber coupler is inserted into the fixing guard tube; and
   the fixing guard tube and the first and second optical fibers together are enclosed by the sheet material.

2. The optical fiber holding structure of claim 1, wherein the fixing guard tube comprises:
   a main body comprising a stowing opening formed along a longitudinal direction of the optical fibers; and
   a lid for closing the stowing opening.

3. The optical fiber holding structure of claim 1, wherein:
   pumping light is entered into the first optical fiber; and
   signal light is entered into the second optical fiber.

4. The optical fiber holding structure of claim 1, wherein longitudinal optical fiber portions of the first optical fiber are wound and disposed elliptic.

5. The optical fiber holding structure of claim 4, wherein the optical fiber portions to be wound and disposed elliptic are disposed not to overlap with one another along the thickness direction of the sheet material.

6. The optical fiber holding structure of claim 4, wherein the optical fiber portions to be wound and disposed elliptic are laminated to one another along the thickness direction of the sheet material.

7. The optical fiber holding structure of claim 1, wherein an end portion of at least one of the first and second optical fibers is extended out of the sheet material.

8. The optical fiber holding structure of claim 1, wherein end portions of the first and second optical fibers are extended out of the sheet material.

9. The optical fiber holding structure of claim 8, wherein the first and second optical fibers are extended out from the same end portion of the sheet material.

10. The optical fiber holding structure of claim 1, wherein the first optical fiber is an amplification optical fiber.

11. The optical fiber holding structure of claim 10, wherein a portion of the second optical fiber is optically coupled to one end portion of the first optical fiber.

12. The optical fiber holding structure of claim 10, wherein:
    another optical fiber is fusion spliced to one end portion of the first optical fiber; and
    the another optical fiber and the second optical fiber are optically coupled in portions.

13. The optical fiber holding structure of claim 10, further comprising a plurality of second optical fibers, wherein the second optical fibers are optically coupled in portions to individual two end portions of the first optical fiber.

14. The optical fiber holding structure of claim 13, wherein:
    the two end portions of the first optical fiber are mutually laminated along the thickness direction of the sheet material; and the second optical fibers optically coupled to individual two end portions of the first optical fiber are extended out together from the same end portion of the sheet material.

15. The optical fiber holding structure of claim 1, wherein:
the optical fiber holding structure comprises a plurality of optical fiber configurations each comprising the first optical fiber and the second optical fiber, and the optical fiber coupler; and the sheet material integrally holds the plurality of optical fiber configurations.

16. The optical fiber holding structure of claim 15, wherein the plurality of optical fiber configurations are laminated together in the thickness direction of the sheet material.

* * * * *